July 5, 1966  A. H. MINTEER  3,259,423
UNDERSEAT LITTER RECEPTACLE FOR VEHICLES
Filed March 4, 1965
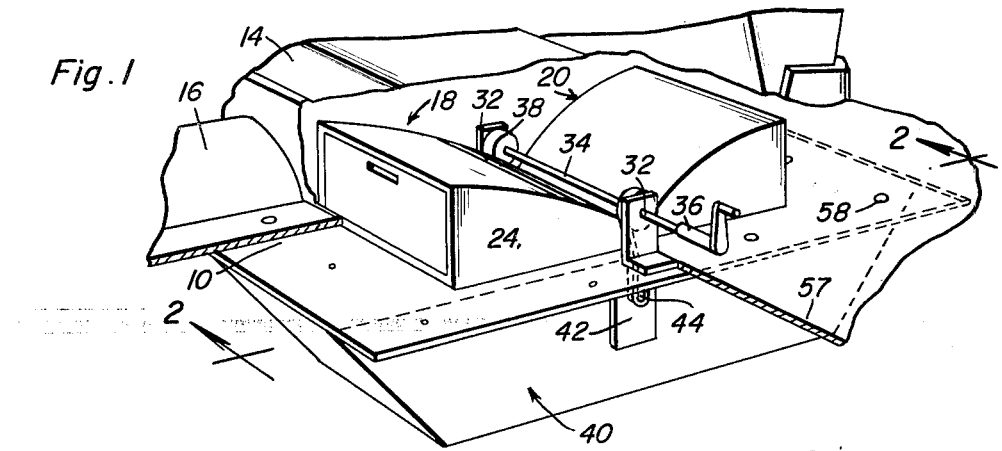
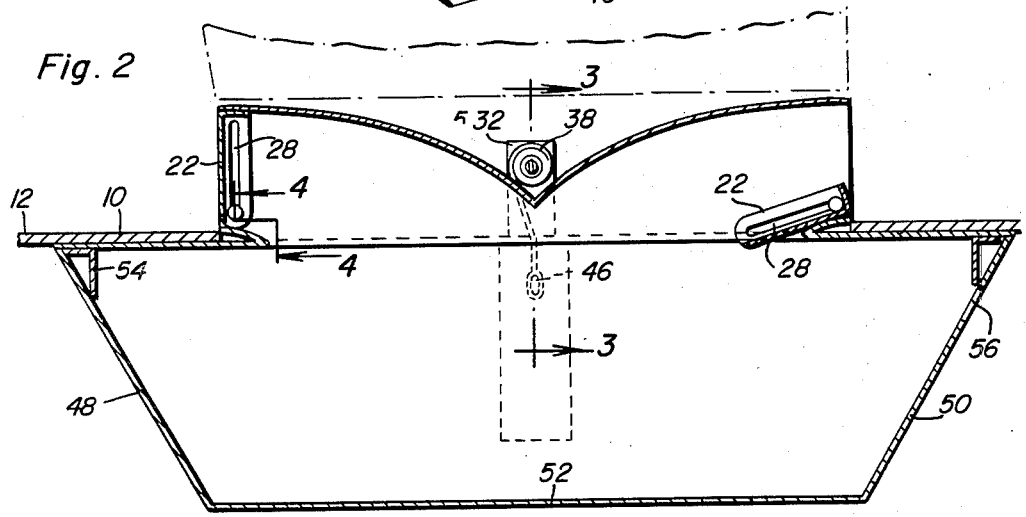
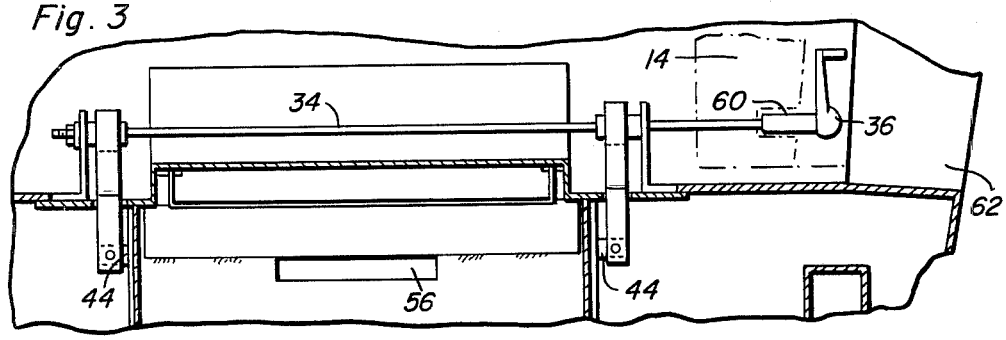
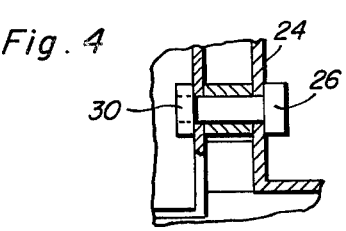
Arthur H. Minteer
INVENTOR.
BY *Clarence A. O'Brien*
*and Harvey B. Jacobson*
Attorneys United States Patent Office 3,259,423
Patented July 5, 1966

3,259,423
UNDERSEAT LITTER RECEPTACLE FOR
VEHICLES
Arthur H. Minteer, 2800 Wildwood Road,
Maryville, Tenn.
Filed Mar. 4, 1965, Ser. No. 437,162
6 Claims. (Cl. 296—37)

The present invention relates to a new and useful improvement in litter receptacles, and more particularly pertains to a litter receptacle for the underseat area of a motor vehicle.

For reasons of public health and safety, expensive campaigns are conducted by municipalities, and States, to encourage people to keep the streets, highways, and countryside free of litter. When such litter is distributed, or dispersed about the countryside, streets or roads the effect is nauseating and besides being an eyesore is unsanitary. In order to clean up the litter expensive trash and litter cleaning operations must be conducted by public services to thereby restore the municipalities, and outlying countryside to a clean and orderly appearance. Therefore many ordinances and statutes have been established which imposes penalties on individuals for throwing trash and litter from automobiles.

In many instances it is inconvenient to store litter or trash within automobiles, and this very often results in noncompliance with such campaigns, ordinances and statutes. Such inconvenience as is encountered in the utilization of litter storage devices presently available involves one or more factors such as presenting an unsightly appearance in the automobile, occupying an obstructive position that interferes with the freedom of movement of the position of automobile occupants and presenting difficulties as to litter insertion or as to removal of litter therefrom. The initial and/or maintenance cost of available or proposed litter storage devices can also be an important factor discouraging their use, thereby tending to frustrate the public.

The primary object of this invention is to provide a litter receptacle which may be stored under the floor, and under the front seat of an automobile, whereby the litter receptacle is out of the way of occupants in the car, and thus does not present an unsightly appearance in the car.

Another important object of this invention is to provide a litter receptacle that can be furnished as an attachment for installation in automobiles or provided as a part of the original automotive equipment.

Still another important object of the invention is to provide a litter receptacle from which accumulated trash and litter can be effectually removed, for example, as a part of the service routine of a filling station.

Yet another important object of the invention is to provide a retractably mounted litter receptacle incorporating a removable and disposable litter receptacle, which is attached to a shaft, and crank mounted to the floor of the automobile whereby the litter receptacle may be raised and lowered in relationship to the floor of the automobile.

Broadly, the litter receptacle of the present invention involves a litter receptacle construction for automobile use comprising a base mounted to the floor of an automobile and under the front seat of the automobile. A pair of chutes are mounted to the base and extend to the front and rear of the automobile respectively. Brackets mounted to the base and on either side of the chutes are provided with a shaft therein, which shaft has a cord means thereon for raising and lowering the litter receptacle which is attached to the cord means, and is disposed beneath the base. The front wall and back wall of the chute are provided with doors, which doors may be pivoted about a pivot pin, and retracted or cammed along a groove in the doors to a position for easily receiving trash, or litter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the litter receptacle of this invention showing the litter receptacle positioned under the front seat, and floor of an automobile with parts of the floor being broken away;

FIGURE 2 is a cross-sectional view taken substantially along section line 2—2 of FIGURE 1 and showing the litter receptacle and chutes mounted to the floor and under the seat;

FIGURE 3 is a sectional view of the chute and receptacle taken substantially along section line 3—3 of FIGURE 2; and FIGURE 4 is a sectional view of the pin and groove arrangement for sliding the door down into the receptacle taken substantially along section line 4—4 of FIGURE 2.

Now referring more particularly to the drawings, a base 10 is mounted to the floor 12 of an automobile under a seat 14. A hump 16 rises in the floor 12 to allow the drive shaft of the automobile to pass thereunder.

The base 10 has chutes 18 and 20 mounted thereon which chutes have a door 22 mounted in the face thereof. The sides 24 of the chute are provided with a pin 26 extending therefrom toward the side edges of the door 22. The edges of the door have grooves or slots 28 therein which receive the pin 26 with a head 30 retaining the pin in the groove. The door 22 may be pivoted about the pin 26, and may be retracted within the chutes by forcing the doors down into the chutes along the grooves 28 substantially to the position shown on the right side of FIGURE 2. Right angle brackets 32 are provided on each side of the chutes 18 and 20 and are secured to the base 10. The chutes 18 and 20 converge from the edge of the front of the seat, and of the back of the seat respectively down into a recessed area which is disposed substantially beneath the bottom of the seat 14. This recessed area is adapted to receive a shaft 34 thereover, which shaft has a crank handle 36 thereon for rotating the shaft. A nylon cord 38 is mounted on each end of the shaft and is adapted to be reeled onto or off the shaft 34 as it is rotated.

A receptacle 40 is mounted underneath the floorboard, and base 10 by means of plates 42 which are secured to each side of the receptacle by conventional means such as welds, and which plates 42 have pins 44 rigidly mounted on the outer side thereof. The nylon cord is secured over the pins 44 by means of a loop 46. The front and back side of the litter receptacle 48 and 50 respectively are tapered from the bottom 52 thereof to the top. The top of the receptacle is provided with a transverse angle bracket 54 running thereacross. The back 50 of the receptacle is provided with a ventilating aperture 56 which communicates with the outside of the receptacle.

The litter receptacle of this invention is mounted in the automobile, by bolting the base 10 to the floor 57 as is indicated at 58. The shaft 34 is mounted to the brackets 32 on the base 10 and crank 36 is mounted to the shaft 34 in a recess 60 in the end of the seat 14, and between the seat and door 62.

In the operation of inserting trash into the trash receptacle of this invention the doors 22 are pivoted about the pin 26 to an open position, and then are retracted along the groove 28 in the door to the position shown in the righthand side of FIGURE 2. The litter may be then inserted into the trash receptacle 40 through the opening formed by the open access door, and through an opening in the center of the base plate 10. When it is desired to empty the trash receptacle 11 the crank-shaft 36 may be rotated to lower the receptacle 40 by unwinding of the nylon cord 38 to a position where the receptacle may be picked up by an attendant and emptied. To reposition the trash receptacle 40 back into its litter receiving position under the floorboard 12 illustrated in FIGURE 2, the loops 46 on the nylon cords are inserted over the pins 44 attached to the sides of the trash receptacle 40, and then the trash receptacle may be raised to its litter receiving position by turning the crank 36 to rewind the nylon cord 38 over the shaft 34.

It is contemplated that the shaft for raising and lowering the receptacle may be provided with male and female ends that are hingedly interconnected so that the operating handle can be pivoted so that the crank end of the handle or shaft may be positoned underneath the end of the seat on approximately a ninety degree angle so that no part of the receptacle is visible from the inside of the car except for the access doors.

Another variation in the structure contemplated in this invention is the actual attachment of the access doors and chutes to the bottom of the seat frame instead of being bolted to the floor. This will allow the seat to be adjusted forward and backward without changing the relative position of the access doors and the seat. In other words, both the access channels or chutes and the access doors move with the seat and, of course, an adequate hole through the floorboard is provided to receive litter from any position of the seat.

Also, a swivel snap may be provided on the ends of the raising and lowering cords or straps in order to prevent fouling or twisting when the receptacle is being retracted to working position. Also, if desired, the top wall in the access channels or chutes may be left open to provide additional room for dropping litter or liquids into the receptacle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination in a vehicle, a seat mounted with space thereunder, a litter receptacle movably disposed in said space, said receptacle comprising a bottom wall, upstanding side walls, tapered end walls, a top wall converging downwardly to the center of the receptacle to form a recessed cavity, a shaft disposed centrally of the receptacle in said cavity and a door on each end of the litter receptacle, said shaft supporting the litter receptacle.

2. In combination with an automobile having a seat spaced above the floor thereof, a litter receptacle normally disposed in a retracted position underneath the floor and accessible from the area above the floor, said receptacle having a substantially flat front wall that in the retracted position of the receptacle is substantially inclined and substantially below the floor, means attached to the floor for lowering the receptacle below the floor of the automobile, said means including a shaft with the receptacle being mounted thereon by a cord, said receptacle having an open top and a bottom wall extending rearwardly from the front wall thereof.

3. In combination with a vehicle seat which is mounted on the floor of a vehicle to provide a space between the seat and the vehicle floor, a litter receptacle arranged below said floor, said receptacle comprising a tray disposed below the floor, and a chute arranged above the floor, said chute and tray being arranged in communication with one another, means releasably holding said chute and tray together, a closure on the front end of the chute and pivotal means on the front end of the chute about which said closure pivots into closed position with said closure covering the front of the chute.

4. A trash receptacle for receiving litter therein, said receptacle being adapted to be placed under the seat of an automobile, said receptacle comprising a bottom wall, side walls and inclined end walls, a base disposed over the top of the receptacle and affixed to a support, a pair of chutes mounted on the base and disposed centrally thereof, said base having an opening centrally thereof and said chutes opening through the opening in the base into the receptacle, and a shaft mounted on the base and disposed over the top of the chutes, said shaft having a retractible cord thereon, said cord being attached to the receptacle and being adapted to raise and lower the receptacle.

5. In combination with an automobile having a floor and a seat mounted above the floor in spaced relationship thereto, a base rigidly secured to the floor, said base having an opening centrally disposed therein, a pair of chutes mounted on the base and within the space between the seat and floor with one chute facing the front of the automobile and the other chute facing the rear of the automobile, said chutes having doors in the faces thereof for receiving litter thereinto, said chutes converging downwardly to provide a recessed space over the base, brackets mounted on the base flanking the chutes and a shaft passing through the brackets and being disposed over the recessed space, a litter receptacle disposed under the base, said receptacle having a bottom and upstanding sides and ends, said sides having plates thereon, and a retractible means connected to the plates and to the shaft for lowering and raising the receptable with respect to the base.

6. The combination of claim 5 wherein said doors are provided with grooves in the sides thereof, and said chutes have pins on the sides thereof receivably engaging the grooves in the doors whereby the doors may be pivoted about the pins and retracted into the interior of the receptacle by sliding the doors along the pins in the grooves, and wherein said doors are disposed substanitally along the front edge and back edge of the seat.

References Cited by the Examiner

UNITED STATES PATENTS

| 1,544,018 | 6/1925 | McDonald | 296—37 |
| 2,754,145 | 7/1956 | Mackey | 296—1 |

FOREIGN PATENTS

| 571,193 | 2/1933 | Germany. |

GERALD M. FORLENZA, *Primary Examiner.*

J. E. OLDS, *Assistant Examiner.*